US007496886B2

(12) United States Patent
Puttaswamy et al.

(10) Patent No.: US 7,496,886 B2
(45) Date of Patent: Feb. 24, 2009

(54) METHOD AND SYSTEM FOR PROVIDING CROSS PROJECT COMMITMENTS

(75) Inventors: Keshav Mysore Puttaswamy, Redmond, WA (US); Joseph Hammer, Renton, WA (US); Sundaravadivelan Paranthaman, Sammamish, WA (US); Alexander A. Sourov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 10/955,328

(22) Filed: Sep. 30, 2004

(65) Prior Publication Data

US 2006/0070020 A1    Mar. 30, 2006

(51) Int. Cl.
*G06F 9/44* (2006.01)
(52) U.S. Cl. ...................................... 717/101
(58) Field of Classification Search .......... 717/101–103
See application file for complete search history.

(56) References Cited

U.S. PATENT DOCUMENTS

| | | | | |
|---|---|---|---|---|
| 5,905,985 | A * | 5/1999 | Malloy et al. ................ | 707/100 |
| 6,230,309 | B1 * | 5/2001 | Turner et al. ................ | 717/107 |
| 6,272,675 | B1 * | 8/2001 | Schrab et al. ............... | 717/100 |
| 6,314,555 | B1 * | 11/2001 | Ndumu et al. .............. | 717/101 |
| 6,339,838 | B1 * | 1/2002 | Weinman, Jr. .............. | 717/104 |
| 6,519,763 | B1 * | 2/2003 | Kaufer et al. ............... | 717/101 |
| 6,609,100 | B2 * | 8/2003 | Smith et al. .................... | 705/8 |
| 6,959,425 | B1 * | 10/2005 | Krauklis ...................... | 715/864 |
| 7,017,146 | B2 * | 3/2006 | Dellarocas et al. .......... | 717/106 |
| 7,020,869 | B2 * | 3/2006 | Abrari et al. ................. | 717/108 |
| 7,027,997 | B1 * | 4/2006 | Robinson et al. ............... | 705/9 |
| 7,222,330 | B2 * | 5/2007 | Bicknell et al. ............. | 717/101 |
| 2002/0069120 | A1 * | 6/2002 | Stephens et al. ................ | 705/26 |
| 2002/0188597 | A1 * | 12/2002 | Kern et al. ....................... | 707/1 |
| 2003/0106039 | A1 * | 6/2003 | Rosnow et al. .............. | 717/100 |
| 2004/0221256 | A1 * | 11/2004 | Martin et al. ................ | 717/101 |
| 2004/0255265 | A1 * | 12/2004 | Brown et al. ................ | 717/101 |
| 2005/0240898 | A1 * | 10/2005 | Mankotia et al. ............ | 717/101 |
| 2005/0262471 | A1 * | 11/2005 | Wagner et al. .............. | 717/101 |
| 2006/0010418 | A1 * | 1/2006 | Gupta et al. ................. | 717/101 |

OTHER PUBLICATIONS

Frank Maurer, Barbara Dellen, Fawsy Bendeck, Sigrid Goldmann, Harald Holz, Boris Kötting, and Martin Schaaf, "Merging project planning and Web enabled dynamic workflow technologies", IEEE Internet Computing, vol. 4, Issue: 3, May/Jun. 2000.*
Fountain et al. "Antecedents of sustainability in cross-agency information-based networks", May 2004, Digital Government Research Center, pp. 1-2.*
Weitzman et al. "Transforming the content management process at IBM.com", Apr. 2002, ACM, pp. 1-15.*

* cited by examiner

*Primary Examiner*—Wei Y Zhen
*Assistant Examiner*—Anna Deng
(74) *Attorney, Agent, or Firm*—Merchant & Gould; Ryan T. Grace

(57) ABSTRACT

Methods and systems are provided for managing dependencies between projects in a project management application. The methods and systems utilize one or more project webs which are shared web-based collaborative workspaces for managing dependencies between projects.

10 Claims, 10 Drawing Sheets

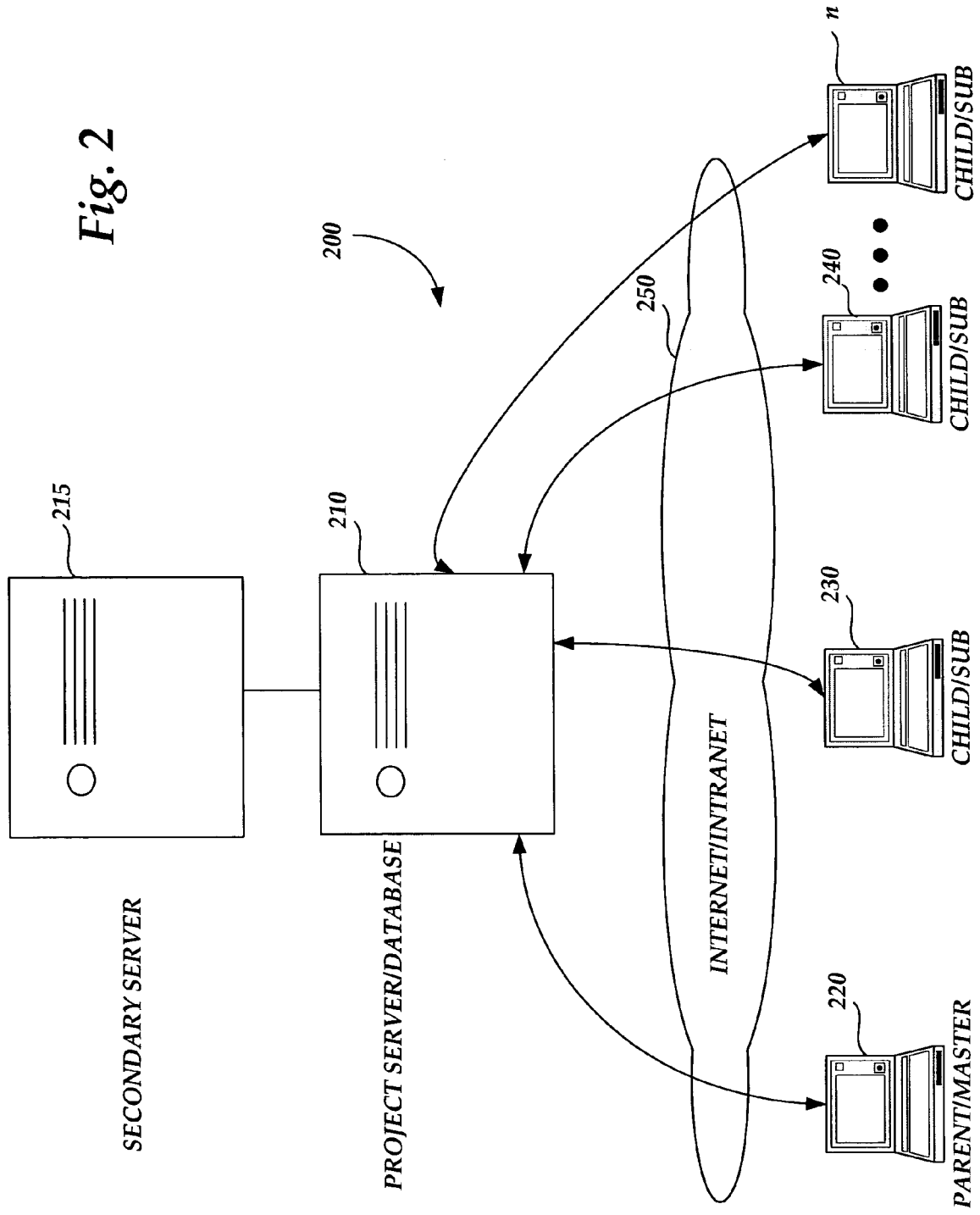

METHOD AND SYSTEM FOR PROVIDING CROSS PROJECT COMMITMENTS

FIELD OF THE INVENTION

The present invention generally relates to project management methods and systems. More particularly, the present invention relates to methods and systems for providing and maintaining commitments or dependencies between projects for an enterprise project management application.

BACKGROUND OF THE INVENTION

With the advent of the computer age, computer and software users have grown accustomed to user-friendly software applications that help them write, calculate, organize, prepare presentations, send and receive electronic mail, make music, and the like. Modern word processing applications, for example, allow users to create and edit a variety of useful documents. Modern project management applications, as another example, allow users to create project management schedules for organizing and managing tasks, resources and labor associated with a variety of projects.

Manual and computerized project management systems allow managers and planners to organize and plan the tasks, resources and schedules required for completion of a given project. In most projects, a number of dependencies and constraints dictate the timing and completion of an overall project and of sub-projects comprising the overall project. For example, in a house construction project, a drywall sub-project may not typically begin until the completion of electrical work. And, a number of sub-projects may be constrained by the availability of labor and resources. Project management software applications have been developed for creating and automating project management schedules. With many such systems, tasks or sub-projects comprising an overall project are set out in scheduling charts, such as Gantt Charts, showing start dates and finish dates for given milestones and associated tasks comprising the overall project and providing information regarding utilized resources and constraints associated with the milestones and tasks comprising the project.

A commitment is an agreement between two people (or organizational entities) to fulfill a set of conditions. That is, commitments may be described as dependencies between two or more entities. For example, a first company team may commit to delivering a prototype of an application to a second company team by a date certain, Aug. 8, 2005. The team responsible for getting the work done is the "commitment provider", while the team relying on the timely completion of the set of conditions is known as the "commitment consumer." In this example, the commitment itself is the delivery of the application prototype.

In prior versions of Microsoft Project, this sort of dependency between projects was modeled using cross-project links ("CPLinks"). In Microsoft Project Standard, for example, to establish the dependency, a user would be required to open both projects and drag a dependency link from one task in one project to the other task in the other project. That is, CPLinks provided a tightly coupled implementation where a task from one project was imported into another project at a client station. Moreover, with CPLinks, a dependency that spans from one task in a project A to another task in a project B is treated the same way as two tasks in the same project are treated. Whenever the originating task changed by any means, the task was updated in any project that linked to the affected task. This automatic process can be very invasive to all of the projects involved, a potentially unacceptable result for a project manager of an affected project.

For example, a change in a task in project1 could result in a cascading update in project1 where a cross project linked task had one or more dates affected. The cross project linking system would then open up linked projects, project2 and project3, for example, and update the mirror of the linked task in those projects. This would often result in complete schedule shifts in the affected projects with no mechanism to undo the changes or to stop the changes from occurring. To complicate matters further, project2 and project3 might provide CPLinks themselves that are modified during the initial CPLink update. This would cause all of the projects relying on project2 and project3 to be opened and updated.

Basically one of the problems that customers face today when they're managing multiple projects is handling dependencies that span various projects. For example, assume two projects exist, project A and project B. Project B may have dependencies (i.e. tasks, resources, etc.) which depend on project A and vice versa. Customers face a fairly difficult problem managing those dependencies between projects. When something affects a task in project A, project B would like to know about it.

Currently, the task in project A is reflected "as-is" in project B. This results in a lot of "noise" as even a small change of date in project A affects project B's schedule. In the real-world, a project manager that has a commitment to another project usually would like to control the date "visible" to the other project, and allow the task in his project some buffer prior to the actual commitment date. On the flip side, project manager of project B would like to control how task changes in dependent projects affects his schedule.

SUMMARY OF THE INVENTION

Embodiments of the present invention solve the above and other problems by providing methods for providing cross project commitments in a project management application. Commitments exist independently of the tasks that they model, and the one or more tasks that rely on them. The commitments are also independently stored from their consumers and providers. One embodiment of the invention provides a method for managing a program having one or more projects using an enterprise project management application. The method includes generating a project schedule including scheduling data, provisioning a web for the project, and, creating project dependency data on the project web. Another embodiment of the invention provides a method for managing a program having one or more projects using an enterprise project management application by creating a commitment related to a first project, the commitment including at least one task, a start date, and a completion date, receiving the commitment to on a project web, and storing the commitment on the project web. Yet another embodiment of the invention provides a method for managing a program having one or more projects using an enterprise project management application by providing a commitment related to a first project, the commitment related to at least one task, a start date, and a completion date, sending the commitment to a project web, and using the project web to provide the commitment to other users.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 2 is a simplified block diagram of a distributed computing environment depicting interrelationships between the owners/managers of a parent project and one or more child sub-projects in communication with a project server/database and secondary server according to embodiments of the present invention;

DETAILED DESCRIPTION

As briefly described above, embodiments of the present invention are directed to methods and systems for providing and maintaining commitments in an enterprise project management application. The methods and systems are operable to manage commitments or dependencies between projects in an enterprise project management application. The invention utilizes one or more project webs which are shared web-based collaborative workspaces for managing dependencies between projects.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Operating Environment

Figure 1:
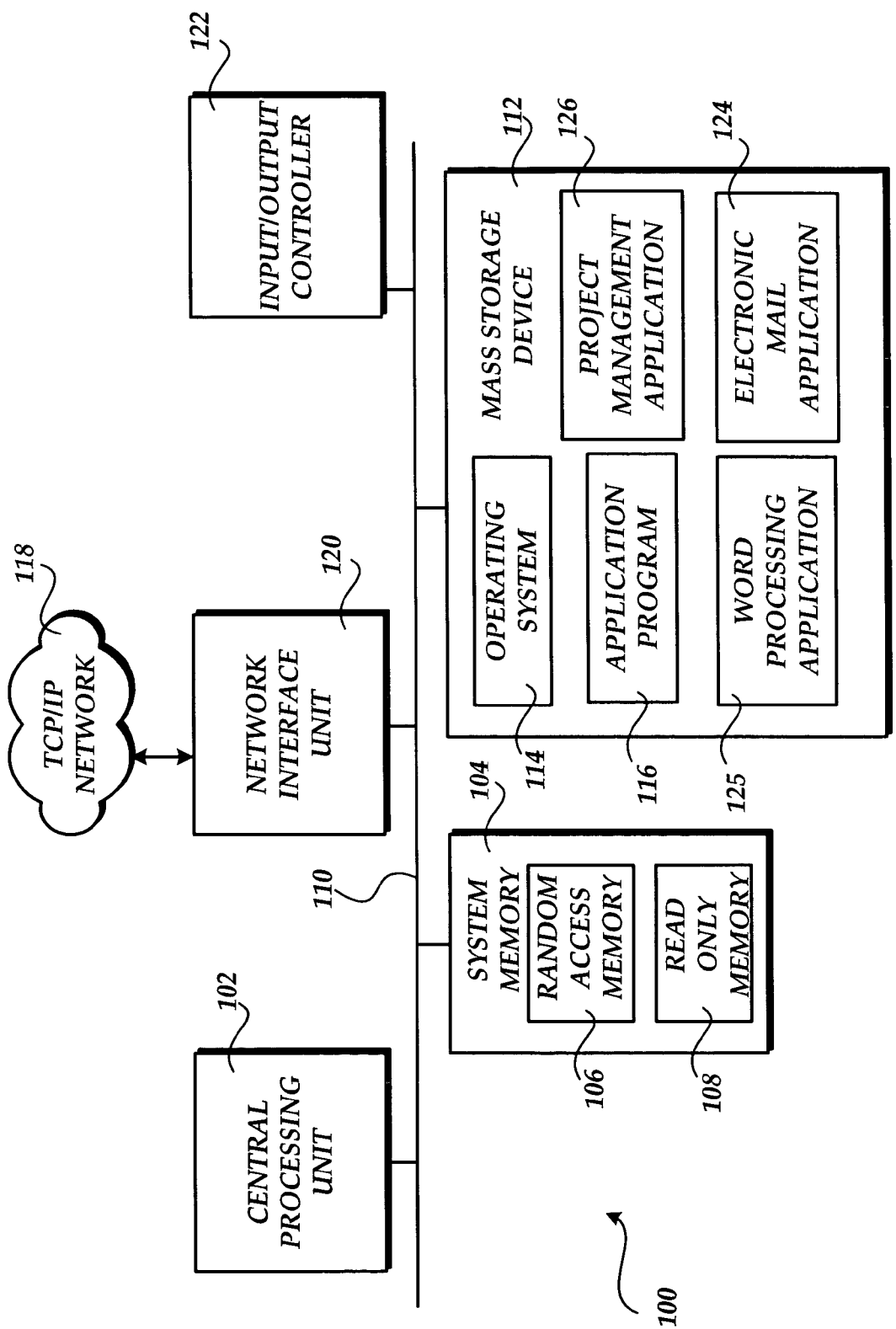
FIG. 1 illustrates an exemplary computing system for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 100 for practicing the various embodiments of the invention will be described. The computer architecture shown in FIG. 1 illustrates a conventional personal computer, including a central processing unit 102 ("CPU"), a system memory 104, including a random access memory 106 ("RAM") and a read-only memory ("ROM") 108, and a system bus 110 that couples the memory to the CPU 102. A basic input/output system containing the basic routines that help to transfer information between elements within the computer, such as during startup, is stored in the ROM 108. The personal computer 100 further includes a mass storage device 112 for storing an operating system 114, application programs, such as the application program 116, and data.

The mass storage device 112 is connected to the CPU 102 through a mass storage controller (not shown) connected to the bus 110. The mass storage device 112 and its associated computer-readable media, provide non-volatile storage for the personal computer 100. Although the description of computer-readable media contained herein refers to a mass storage device, such as a hard disk or CD-ROM drive, it should be appreciated by those skilled in the art that computer-readable media can be any available media that can be accessed by the personal computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 100 may operate in a networked environment using logical connections to remote computers through a TCP/IP network 118 or other network, such as the Internet. The personal computer 100 may connect to the TCP/IP network 118 through a network interface unit 120 connected to the bus 110. It should be appreciated that the network interface unit 120 may also be utilized to connect to other types of networks and remote computer systems, such as local, wide-area, and other networks. The personal computer 100 may also include an input/output controller 122 for receiving and processing input from a number of devices, including a keyboard or mouse (not shown). Similarly, an input/output controller 122 may provide output to a display screen, a printer, or other type of output device.

As mentioned briefly above, a number of program modules and data files may be stored in the mass storage device 112 and RAM 106 of the personal computer 100, including an operating system 114 suitable for controlling the operation of a networked personal computer, such as the WINDOWS operating systems from Microsoft Corporation of Redmond, Wash. The mass storage device 112 and RAM 106 may also store one or more application programs. In particular, the mass storage device 112 and RAM 106 may store an application program 116 for providing a variety of functionalities to a user. For instance, the application program 116 may comprise many types of programs such as a word processing application program, a spreadsheet application, an electronic mail application 124, a word processing application 125, a database application and the like. According to embodiments of the present invention, a project management application 126 is included for preparing project management schedules as described herein. An example project management application for use in accordance with the present invention is E ENTERPRISE PROJECT, hereinafter "PROJECT", manufactured by Microsoft Corporation.

Referring now to FIG. 2, a simplified block diagram of a distributed computing environment 200 is shown. The distributed computing environment 200 enables owners/managers of a parent project and one or more child sub-projects to communicate with a project server/database 210 and a secondary server 215, for creation and maintenance of a project schedule and related commitments or dependencies according to embodiments of the present invention. The distributed computing environment 200 illustrated in FIG. 2 serves as an exemplary operating environment for embodiments of the present invention. As described herein, an overall project schedule may be comprised of a parent project schedule and one or more hierarchically related child sub-projects.

According to embodiments of the present invention, the overall or parent project schedule and individual and independently manageable child sub-project schedules are maintained on a project server/database 210. The project server/database 210 is a general purpose computing system having components including an operating system, a processor and memory space as described above for the computer 100 illustrated and described with reference to FIG. 1. The project server/database 210 also includes a project management application 126 having sufficient computer executable instructions for constructing, displaying and allowing management of the overall/parent project schedule and of the individual child sub-project schedules described herein. The project server/database 210 also includes a relational database for maintaining data associated with the parent project schedule and for each of the individual child sub-project schedules.

According to embodiments of the present invention, as will be described further below, project related commitments or dependencies may be maintained on a secondary server 215, preferably a web server (also termed a collaborative information management server), such as a SHAREPOINT server application offered by Microsoft Corporation as part of its WINDOWS SERVER application for example. The secondary server 215 is a general purpose computing system having components including an operating system, a processor and memory space as described above for the computer 100 illustrated and described with reference to FIG. 1.

As illustrated in FIG. 2, the parent/master computer system 220 is illustrated for communication with the project server/database 210 via a distributed computing system such as the Internet or intranet 250. The secondary server 215 is illustrated for communication with the project server/database 210. The secondary server 215 and the project server/database 210 may communicate via a distributed computing system such as the Internet or intranet, similar to Internet or intranet 250, or other network (wide or local). One or more child/sub-project computing systems 230, 240, . . . ,n are illustrated for communicating with the project server/database 210 via the Internet or intranet 250. In alternative embodiments, the computing systems 210, . . . , n may also be in communication with the secondary server 215.

Each of the individual computing systems 220, . . . , n may also include a project management application 126 described above with reference to FIG. 1, and serving as client-side project management applications to a corresponding project management application 126 operated at the project server/database 210. According to embodiments of the present invention, the project server/database 210 may also include or may be operative to access an electronic mail application 124 for sending automatic project schedule changes to and from owners/managers of the parent project schedule and the child sub-project schedules.

Project Commitments

A cross project commitment transforms a cross project link into an independent entity, herein defined as the cross project commitment (CPC), or simply commitment. According to various embodiments of the invention, commitments are provided and maintained which exist completely independently of the tasks that they model, and the tasks that rely on them. That is, the commitments are stored in an independent manner on a secondary server 308 relative to their consumers and providers. Secondary server 308 provides a brokering service or middle interface between linked projects, where commitment data is stored.

According to one preferred embodiment of the invention, a secondary server 308, such as a SHAREPOINT Server, is provided which includes one or more SHAREPOINT lists to host one or more commitments. A SHAREPOINT server is operable to create and maintain web folders. The web folders may be used to store information, such as commitments. With a SHAREPOINT server, a user may store information, such as objects on a web server or a web folder. A web folder tends to provide a better experience to a user when saving information.

According to embodiments of the present invention, a project management application utilizes a secondary server, such as server 215 and related server applications to provide and maintain project related commitments. Commitments may exist across one or more programs, projects, tasks, etc. In this context, program and project related commitments may be described as program and project dependency data, respectively. As described above, a commitment is generally an agreement between two people (or organizational entities) to fulfill a set of conditions.

The person or entity responsible for getting the work done is the commitment provider, while the person or entity relying on the timely completion of the set of conditions is known as the commitment consumer. In this example, the commitment itself is the fulfillment of the set of conditions. The present invention enables a user to create, provide, consume, modify, and/or delete commitments. It is important to distinguish between the commitment, which is simply a title and dates, and the projects that affect or are affected by a specific commitment. At any point, a commitment can have 0-n providers and 0-n consumers. Providers are defined as objects that may affect a date of the commitment. Consumers are those objects that may be affected by a change in a commitment date.

The initial discussion concerning commitments will limit the number of commitment providers to 0-1. That is, the date of the commitment may be driven by a single task in a project or completely manually, by editing the commitment start and finish dates in a list, such as a SHAREPOINT list, directly. According to a one embodiment of the invention, a SHAREPOINT list storing one or more commitments resides on a SHAREPOINT server, such as secondary server 215. While not limiting the invention, storing commitments in a SHAREPOINT list enables project management application users to: utilize a built-in email notification system, easily connect workflow modules to SHAREPOINT list items, capitalize on developers familiarity with SHAREPOINT extensibility, and custom fields may be assigned to commitments to suit the individual needs of users.

Continuing with the example, a commitment may be consumed by 0-n entities. That is, there is no practical limit to the number of projects or people that can express interest in a commitment. Expressing interest in a commitment may take many forms, including registering for an email notification in the event of a change through the secondary server 215, such as a SHAREPOINT server, or getting an indication in the project management application when a registered commitment has changed. As described below, the invention also provides the ability to synchronize dates on a task with a select commitment.

Operation

Figure 3A:
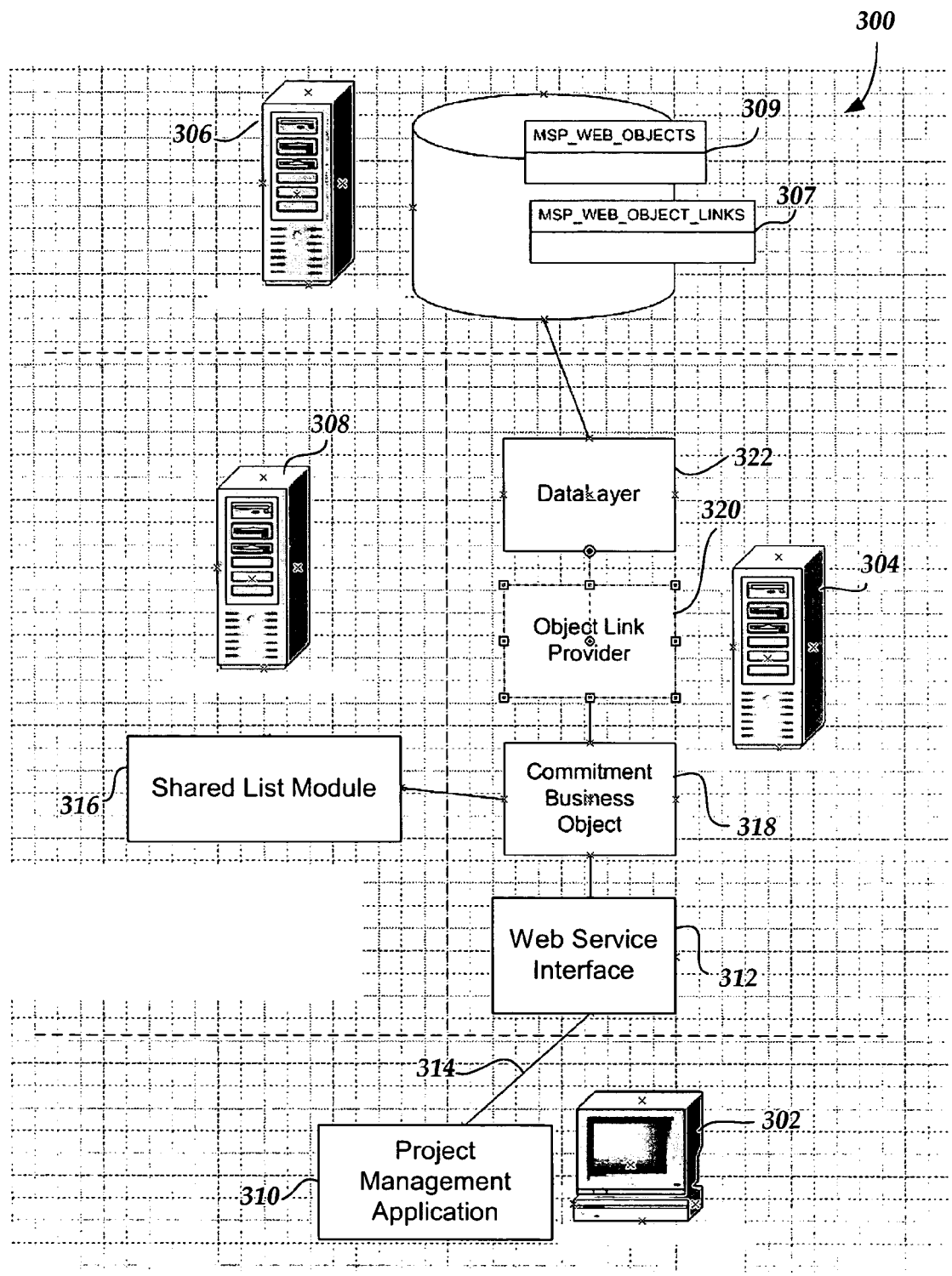
FIG. 3A is a simplified block diagram of a distributed computing environment depicting a client computer in communication with a project server/database and a secondary server according to embodiments of the present invention.

Referring now to FIG. 3A, an embodiment of the invention is shown for providing and maintaining commitments in a project management application. The distributed computing environment 300 includes a computing system 302, a project server 304, a database server 306, and a secondary server 308. The dashed lines in FIG. 3A depict machine boundaries. The components of the distributed computing environment 300 are preferably networked together as described above in conjunction with FIG. 2. However, it will be appreciated that the project server 304 and database server 306 may be implemented as a single server.

According to one embodiment of the invention, computing system 302 includes a project management application 310, such as Microsoft Project Professional, manufactured by Microsoft Corporation, to create and maintain projects. As shown in FIG. 3A, computing system 302 communicates with the web service interface 312 of the project server 304 via link 314, using an Extensible Markup Language (XML) protocol, such as Simple Object Access Protocol (SOAP), or world-wide web protocol, such as Hyper Text Transfer Protocol (HTTP), for example. SOAP is a lightweight XML-based messaging protocol used to encode information in Web service request and response messages before sending them over a network. SOAP messages may be independent of any operating system or protocol and may be transported using a variety of Internet protocols, including SMTP, MIME, and HTTP. The web service interface (PSI) 312 provides a communication interface between computing system 302 and project server 304, as described above with reference to FIG. 2. It will be appreciated that a number of computing systems, similar to those described in conjunction with FIG. 2, may also be in communication with project server 304.

Project server 304 enables online collaboration between project managers, team members, and various individuals and organizations that are actively involved in the project or whose interests may be affected by the project. Project server 304 also enables an organization to share standards across projects, help secure projects with check in and check out capability, view resource availability and other resource information across projects, and manage and report on portfolios of projects. Project server 304 also manages list items and various documents.

From the parent/master computer 220, project managers may connect to the project server 304 to do a number of things: 1) Assign tasks to team members and keep track of completed work to thereby automatically or manually accept task updates from team members and incorporate the updated information into a project; 2) Request and receive status reports in a particular and consolidate individual status reports into one project status report to present to others; 3) Perform what-if analysis to compare costs, schedules, and resource allocation after creating different versions of their project; 4) Assess the effect of schedule changes on resource availability, resource allocation, and costs; 5) View resource availability across an organization and build a team so to assign generic resources to tasks, find and substitute resources based on a skill set, and build teams from a common list of enterprise resources; and/or create and modify commitments.

From a child/sub computer, such as computer 230, various team members may access information on the project server 304 by using the web service interface 312, such as Project Web Access manufactured by MICROSOFT, to: 1) Review and update task assignments and respond to the project manager about certain assignments, and send updates about completed work at regular intervals; 2) Create new tasks and send them to the project manager for approval and incorporation into the project plan; 3) Delegate tasks to other team members; 4) View tasks in a Gantt Chart format for a graphic representation of the duration of tasks and relationships to other tasks; 5) View grouped, sorted, and filtered tasks; 6) Team members may also view the latest information for the entire project, not just assigned tasks; and/or consume commitments. Other project managers or executives, can also access information on the project server 304 using the web service interface 312 to review project, task, and resource information, to see how projects are progressing, individually, or across an organization.

With continuing reference to FIG. 3A, secondary server 308 includes at least one module, shared list module 316 for example, in communication with a commitment business object (CBO) module 318 of project server 304. The CBO module 318 manages communication, including read/write commands, logical operations, etc. between the project server 304 and secondary server 308, preferably using an XML protocol, such as Simple Object Access Protocol (SOAP), for example. The project server 304, according to this embodiment, also includes an object link provider (OLP) 320 for maintaining links between one or more tasks and one or more commitments. OLP 320 may be described as a service for maintaining links between a particular task and a project and a particular commitment item stored in the secondary server 308. Datalayer 322 is in communication with the database server 306 and provides an interface between the project server 304 and the data server 306, operable to read and write from and to the database server 306.

As described herein, "project web" (see FIG. 3B) refers to a shared web-based collaborative workspace on the secondary server 308 that the project server 306 provisions when a project is created using the system 300. The project web enables users to upload documents, raise issues or risks, and then link any of these to actual tasks within a project plan. According to the invention, the system 300 utilizes the project web to store commitments being made by one project which may be shared with other projects. For example, secondary server 308 may include a web service, such as one or more project webs, for keeping track of one or more commitments. Users may query the project web and receive information from the web service based on the query.

As described further below, according to embodiments of the invention, each project web keeps track of one or more commitments which it provides to be consumed. As described above, a commitment may be defined as an agreement between two (or more) entities to fulfill a set of conditions. Generally, there is at least one commitment provider and at least one commitment consumer. For example, suppose a first project manager would like to provide one or commitments to be consumed by one or more commitment consumers, such as other project managers. That is, the first project manager provides tasks, resources, or other data from a certain project for consumption by a second project manager. The first project manager realizes that the second project manager has one or more projects which depend on tasks A, B and/or C.

According to one embodiment of the invention, the first project manager may designate one or more tasks, resources, or other data as one or more "commitments" for consumption by other project managers. These commitments may be stored in a list of the secondary server 308 ("project web"), such as the SHAREPOINT services list of the WINDOWS SHAREPOINT Services web. Once the commitments exist on the project web, any project manager may consume one or more of the commitments. According to a preferred embodiment, after a commitment exists on the project web, any potentially affected consumer is alerted to the commitment, via an e-mail notification, a scheduling program, or from the project management application itself, for example. A consuming project manager may use one or more of the commitments that the providing project manager has stored on the secondary server 308, for consumption on one or more projects. The providing and consuming project managers, and others, now may control how a particular commitment affects a particular project.

Figure 3B:
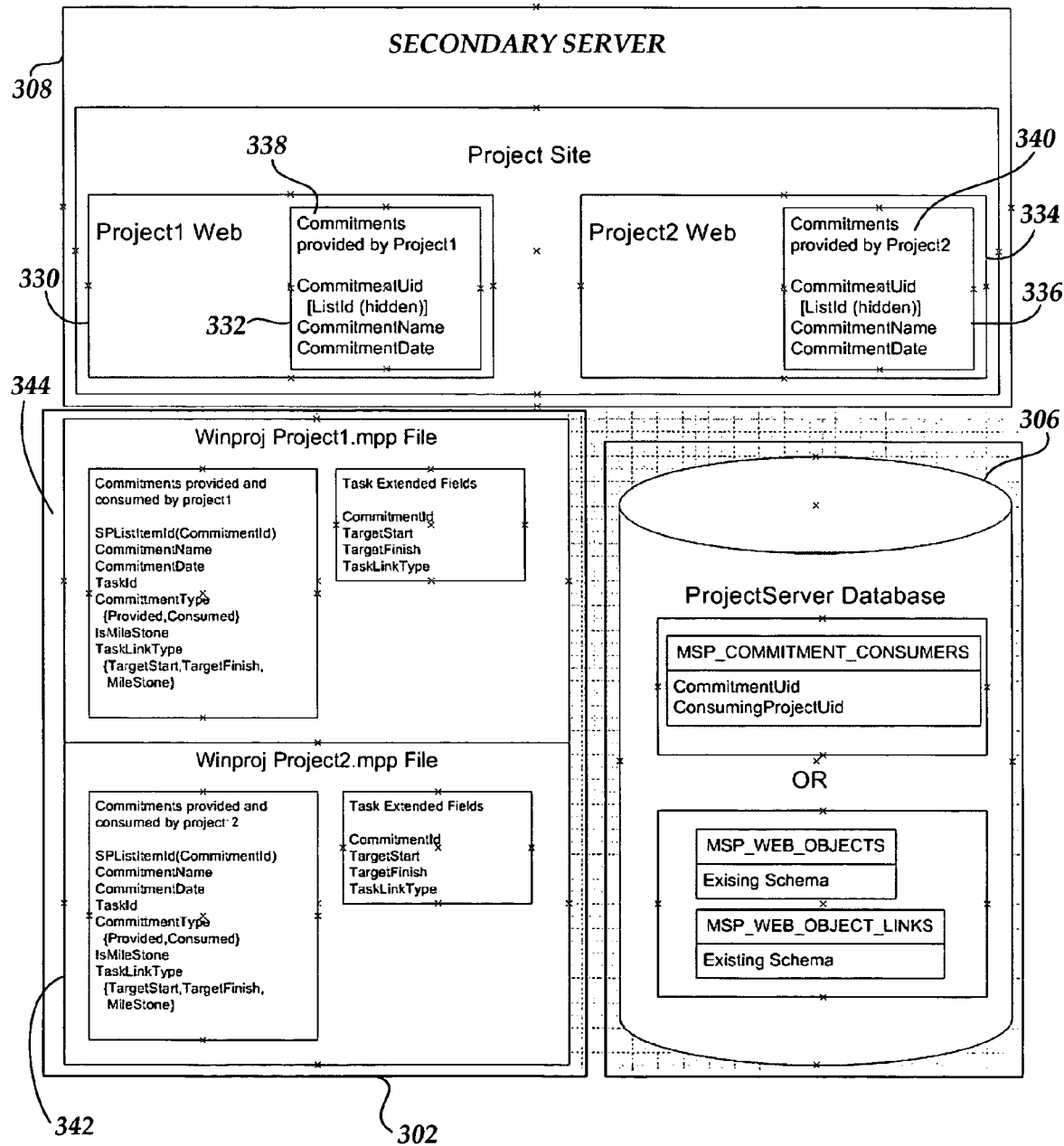
FIG. 3B is a simplified block diagram of a distributed computing environment depicting a portion of a client computer, a project server/database and a secondary server according to embodiments of the present invention.

With additional reference now to FIG. 3B, a functional block diagram is shown depicting a data layout for commitment relationships between the secondary server 308, computing system 302 and the project server database 306. According to an embodiment of the invention, for every project saved to project server 304, a web provision is created on the secondary server 308, such as WINDOWS SHAREPOINT Services web, associated with the particular project. As described above, users may interface with the project web using the project server/database or secondary server 308 to upload project documents, create issues, or use other features of the secondary server 308.

As described above, one or more commitments may be stored in a shared list of a shared list module 316 on the secondary server 308, such as a SHAREPOINT list of a SHAREPOINT module stored on a SHAREPOINT server. For example, as shown in FIG. 3B, the secondary server 308 includes a first project web 330 having a first shared list 332. The first shared list 332 includes commitments 338 related to a first project. The secondary server 308 also may include a second project web 334 having a second shared list 336. The second shared list 336 includes commitments 340 related to a second project. It will be appreciated that the secondary server 308 may include any number of project webs and the invention is not intended to be limited by any specific examples or embodiments disclosed herein.

According to the invention, each project web keeps track of the commitments which it provides to be consumed. A particular commitment provider may be inferred from the location of the list (In Project_2's web, for example). According to an embodiment of the invention, tasks which are linked to consumed commitments are stored in a MSP_WEB_OBJECT_LINKS table 307 of the database server 306. Database server also may include a MSP_WEB_OBJECTS table 309, described below.

As shown in FIG. 3B, the application 310 on the computing system 302 utilizes project related files, binary .mpp files for maintaining certain project data, according to this embodiment. All consumer data may be stored in the binary .mpp files, such as .mpp files 342 and 344, and MSP_WEB_OBJECT_LINKS of the database server 306. Provider task linkage may also be kept in binary .mpp files and MSP_WEB_OBJECT_LINKS of the database server 306.

According to one embodiment of the invention, the majority of provider data may be normalized for reporting purposes via extended task fields on associated tasks, including:
  TargetStart
  TargetFinish
  CommitmentLinkType
  CommitmentUid (also in MSP_WEB_OBJECTS)
  Four fields may be added to tasks in the project management application:
  CommitmentUid
  CommitmentLinkType  (TargetStart,TargetFinish,Consumed)
  TargetStart
  TargetFinish
  Record of commitments/milestones may be kept in the project management application:
  SPListItemId(CommitmentId)
  CommitmentName
  CommitmentDate (or CommitmentStart and CommitmentFinish)
  TaskId
  CommittmentType
    Provided
    Consumed
  IsSharedMileStone
  TaskLinkType
    TargetStart
    TargetFinish
    MileStone (This is for consumed commitments and shared milestones which may not have a relevant TaskLinkType)
  Data may be stored in the WebObjectDocument, which is a project level XmlDomDocument containing all of the web objects linked to a particular project.

As described below, binary .mpp files typically reside on a computing system, such as system 302. According to one embodiment of the invention, the .mpp files store project specific linkage information for a particular commitment or set of commitments, including a list of commitments, task linkage, and target dates for those commitments. The information may also include whether each commitment is tied to the start or finish (or both) of an individual task, or if it is an imported (or consumed) commitment.

The data in the database server 306 may consist of the reporting information extracted from the .mpp files and object linkage information. As used herein, object linkage information is the record of what commitment is linked to what project, as well as where each commitment is stored in secondary server shared lists. The secondary server 308, preferably stores the actual list of commitments. Commitments may exist in a very simple, extensible list on each provider project. When a commitment is created, it is created on the web controlled by the provider project (see FIG. 3B).

According to one embodiment of the invention, data kept in the shared list may include a commitment name and dates (including start and finish dates), for example. A particular commitment provider may also be inferred from the web location of the list (In Project_14's web, for example). Preferably, no record of the commitment consumers is kept in an individual web. As shown in FIG. 3B, all consumer data is stored binary .mpp files on computer 302 and MSP_WEB_OBJECT_LINKS on the database server 306. As shown, the MSP_WEB_OBJECTS table 309 may include an entry for each commitment, in similar fashion to the way risks, issues, and documents are tracked.

Any object in the database server 306 linked to a project web object may be stored in the Object Link Provider 320. The objects may consist of projects and tasks which live only on the computer system 302 side and then commitments, issues, risks and some other things that we store on the project web side. The links between these objects may be stored in the Object Link Provider 320. For example, suppose project A is providing one or more commitments, such as key tasks. Project B would like to consume one or more of the commitments. The project management application 310 communicates with the web service interface 312 which in conjunction with the commitment business object 318 writes the commitments into a shared list on a project web. The commitment business object 318 also provides links between the tasks in the project and the commitment line item in the shared list and the Object Link Provider 320. Thus, the system 300 keeps knows that one commitment is linked to a specific task. As described further below, a consuming project manager can view any commitments that have been made by a providing project manager and may opt to consume those commitments.

Commitments

According to embodiments of the invention, commitments may be created and consumed when managing one or more schedules using the project management application. As described above, the commitments are preferably stored in shared lists on the secondary server 308. When a commitment is consumed in a project it is basically linked to a task in the consumer project or a new task can be created for it. The commitment task may also have a special flag set called "CommitmentFlag". The committed task may be a zero duration milestone task or a task with a start and finish date set and therefore a non-zero duration. A flag is stored in the task and this flag may be used for project related matters, such as specially formatting Gantt bars for example. Provided commitments may be commitments that originate in the project management application file the user is currently browsing. Consumed commitments are those commitments that the user has imported into a project that originated in one or more other projects.

Figure 4:
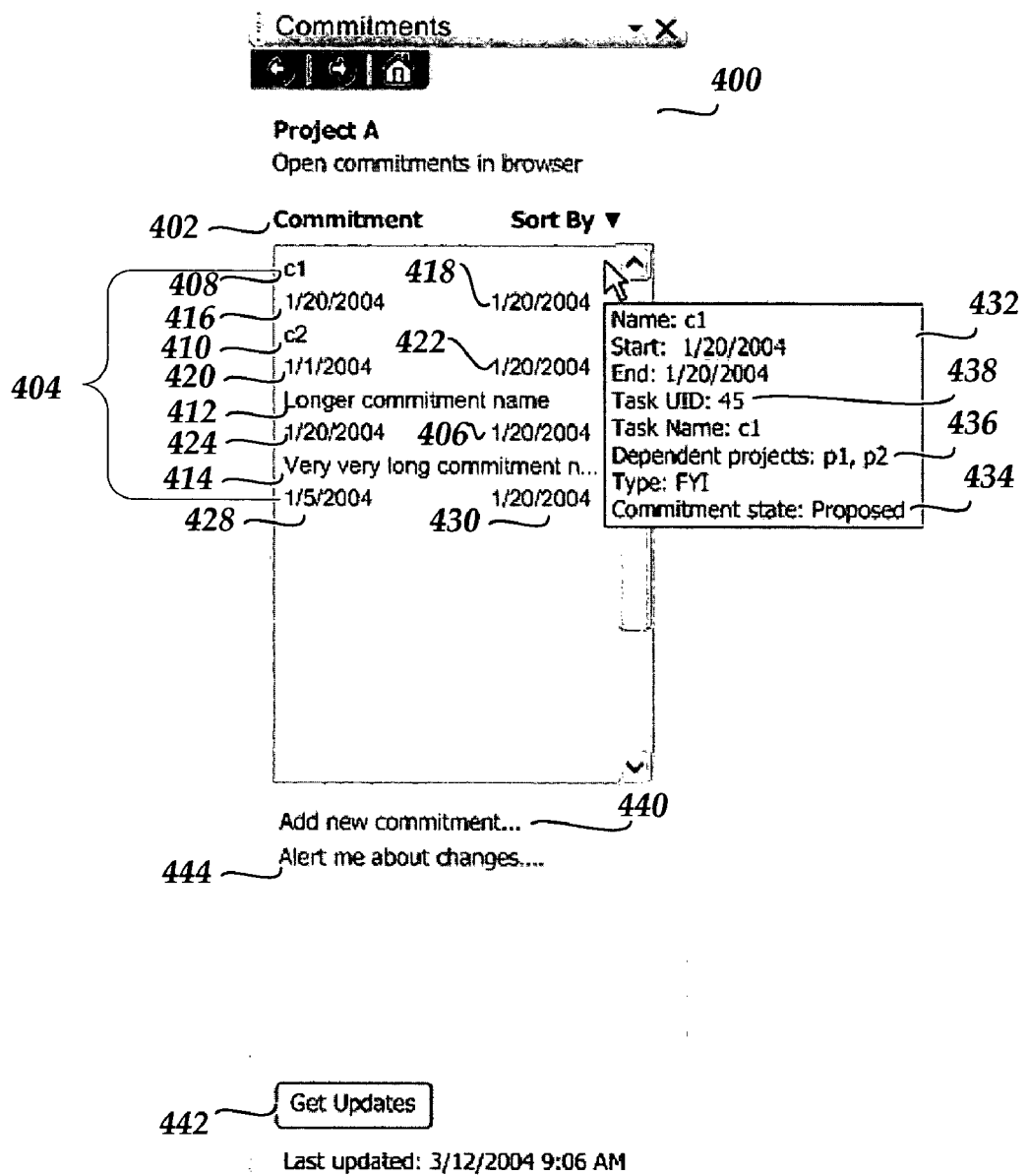
FIG. 4 depicts a commitment pane of a project management application according to embodiments of the present invention.

Referring now to FIG. 4, an embodiment of the invention is described. FIG. 4 is a screen shot from a project management application, illustrating a commitment pane 400 that a user sees when displaying commitments 402. The current view depicts provided commitments 404 related to a number of tasks for a particular project or program. Each commitment has a description 408-414, and an associated start and end dates 416-430, letting the user know the type of associated task and a projected completion date, for example. When the user hover(s) a pointer above a commitment, a pop-up pane 432 preferably provides greater detail to the user. Some of the detail may include commitment state 424, Dependent projects 436, task name, and/or task UID 438, etc. The commitment pane 400 enables a user to add a new commitment 402 or edit/delete existing commitments. The pane 400 preferably displays all commitments made by the particular project as stored in a commitment lot on the secondary server 308. According to alternative embodiments, the detail pane 424 may also include linked MSP_WEB_OBJECTS and extended SHAREPOINT fields. It will be appreciated that greater or fewer details may be shown in the commitment detail pane.

Figure 5:
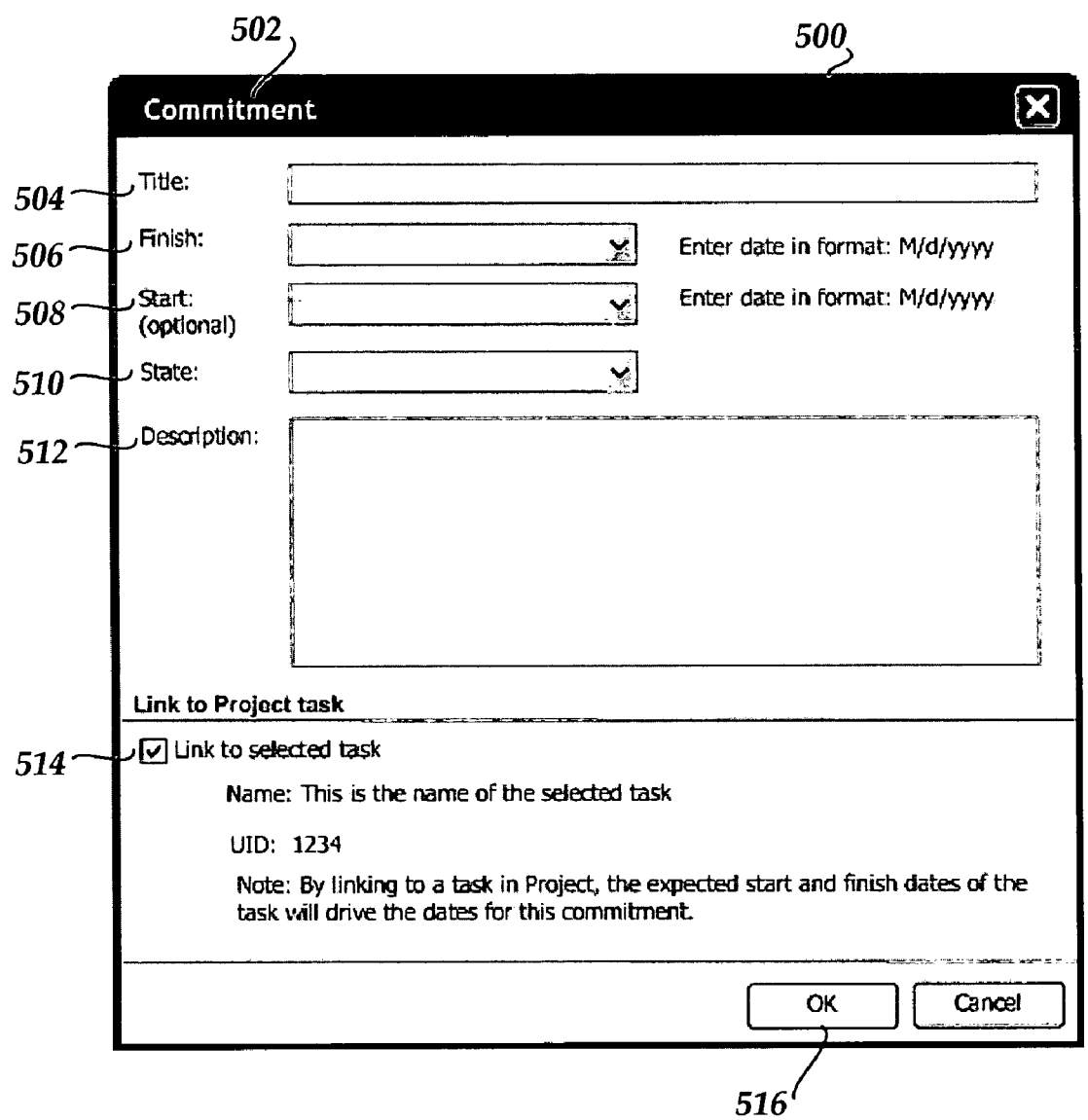
FIG. 5 depicts a commitment dialog pane of a project management application according to embodiments of the present invention.

Referring now to FIG. 5 and with continuing reference to FIG. 4, a commitment dialog pane 500 is depicted. When a user clicks "add new commitment" 440, the dialog pane 500 opens, enabling the user to create or add commitments using project management application 310, for example. The user may also get project application updates by clicking on the "get update" button 442 or be alerted to project related changes by clicking on "change alert" 444. As described above, when the user clicks "add new commitment" 440, a web service interface 312 call is made using an XML string such as "WSI.CreateCommitment(CommitmentData)", where CommitmentData consists of CommitmentName, ProjectUid, TaskUid, CommitmentStart, and CommitmentFinish. The return value of CreateCommitment is an XML string representing the commitment web object from the respective project web.

Figure 6:
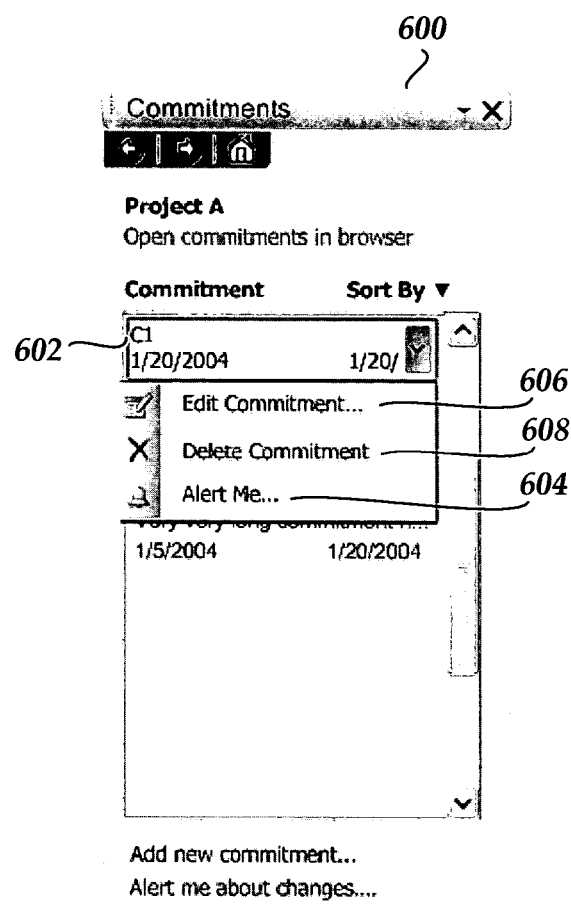
FIG. 6 depicts a commitment pane of a project management application according to embodiments of the present invention.

Using the commitment dialog pane 500, the user may enter the various fields for the commitment 502. The fields include a title 504, finish date 506, start date 508, state 510, and/or a description 512, as described above. In addition, the user may link the commitment to a project task, by checking the link box 514. By doing so, the user is using the expected start and finish dates of the task to drive the particular commitment dates. When the user clicks OK 516, the commitment gets created directly in the shared list of the secondary server 308, via the project server 306. In alternative embodiments, a field, "Commitment GUID", is used to identify one or more commitments when commitments are synchronized (described below) with the secondary server 308. Yet another field, "CommitmentType" may represent whether a commitment is consumed or provided. As shown in FIG. 6, a user may select an existing commitment (from the list of FIG. 4 for example) to Edit or Delete. By right clicking on the commitment 602, a drop down menu 604 enables the user to edit 606 or delete 608 a commitment 602. If the user elects to edit 606 a commitment, the commitment dialog of FIG. 5, allows the user to elect the commitment.

Figure 7:
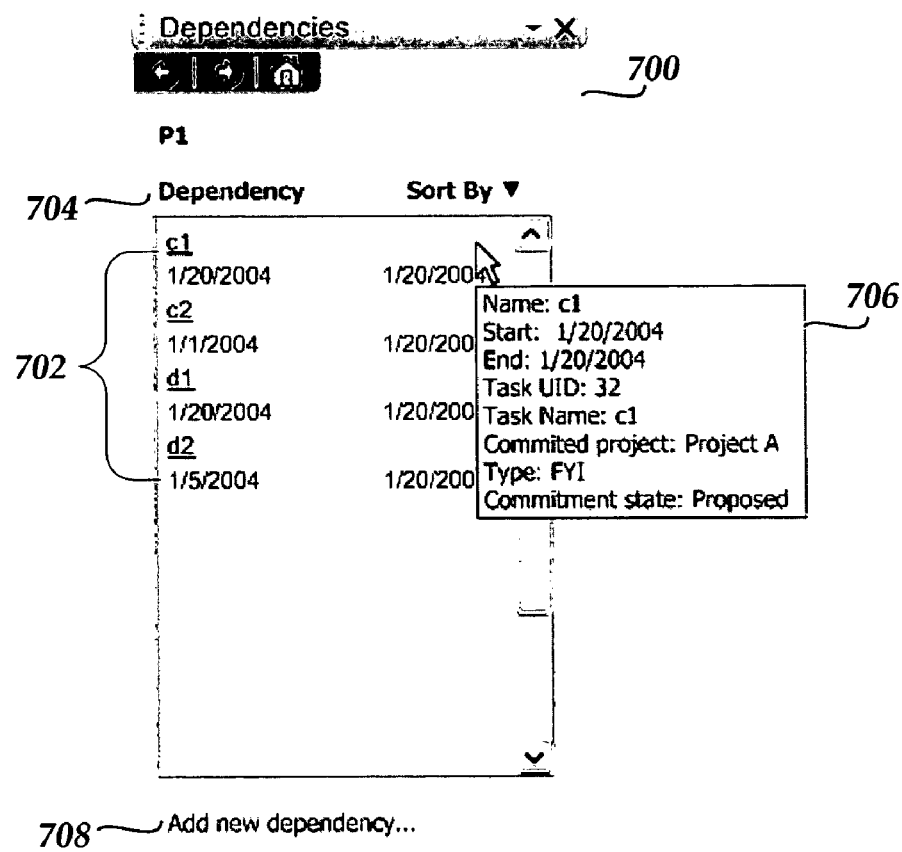
FIG. 7 depicts a dependency pane of a project management application according to embodiments of the present invention.

Referring now to FIG. 7, a dependency pane 700 is shown which lists all commitments 702 made by other projects that a particular project has taken a dependency 704 on. Again, when the user hover(s) a pointer above one of the commitments 702, a pop-up pane 706 preferably provides greater detail to the user. The user may create a new dependency 704 by selecting the "Add new dependency" link 708 which brings the user to the dependency dialog pane 800 shown in FIG. 8.

Using the dependency dialog pane 800, the user may select a project they want to take a dependency on. By clicking the "Browse" button 802, an Enterprise File/Open dialog is opened, allowing the user to select a particular project 804. Once a project is selected, a list of commitments 806 from the project 804 is displayed to the user. When a particular commitment is selected, details 808, such as those described above, of the commitment (preferably read-only) are displayed. By clicking on the link box 810, the user may opt to link the commitment 806 to a task 812 in the project 804. In one embodiment, when a user opts to link a commitment to a task, the particular commitment may "take-over" the expected start and finish dates of the task.

Figure 8:
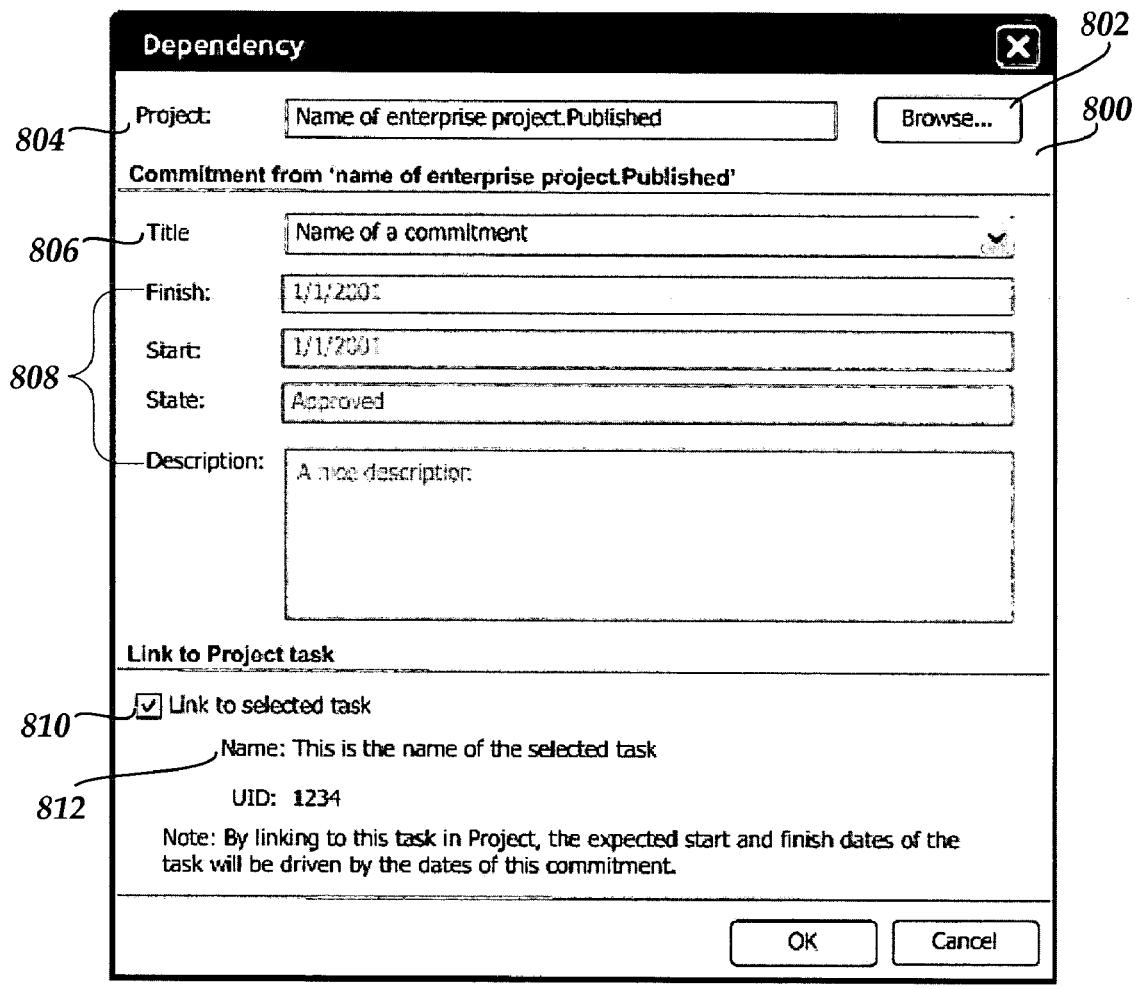
FIG. 8 depicts a dependency dialog pane of a project management application according to embodiments of the present invention.
Figure 9:
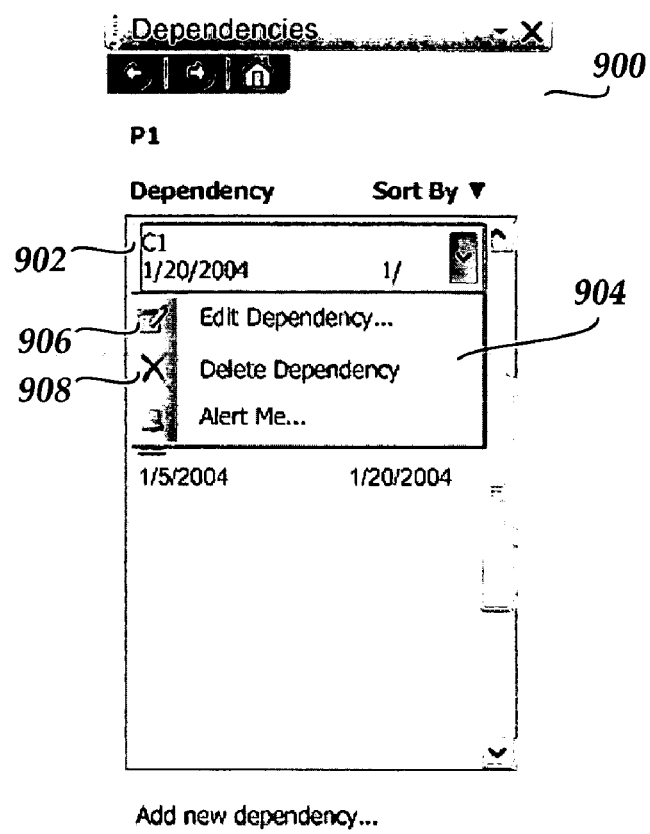
FIG. 9 depicts a dependency pane of a project management application according to embodiments of the present invention.

As shown in FIG. 9, the user may also choose to edit/modify a dependency using dependency dialog pane 900. By right clicking on the dependent commitment 902, a drop down menu 904 enables the user to edit 906 or delete 908 a dependent commitment 902. If the user elects to edit 906 a dependent commitment, the dependency dialog pane 800 of FIG. 8 is presented to the user. If the user chooses to delete a dependency, the dependency link that the project has with the commitment is removed.

According to one embodiment of the invention, four fields may be used by the system 300 to keep track of commitments. The first two fields, "Commitment Start" and "Commitment Finish", represent a date of start and completion of an external commitment. For example, when a commitment is consumed in a project, a task will be created in the consumer project that may be used to account for the commitment in the schedule. This task may be driven by the commitment dates. The third field, "Commitment GUID", is used to identify one or more commitments when commitments are synchronized (described below) with the secondary server 308. The fourth field, "Commitment Type" represents whether a commitment is consumed or provided.

As described above, the project management application enables a project manager to create projects and related schedules, including task, resource, commitments, etc. For example, suppose the project manager utilizes the project management application for preparing a project schedule corresponding to the construction of a house. The construction project may include a number of dependent projects, such as a foundation project, a framing project, electrical and plumbing projects, and a drywall and finishing project. Each project may comprise one or more tasks required for completing the project.

Storing Commitments

For a set of commitments related to a project, for example, the provided commitments and the consumed commitments may be stored along with the project as a document property, which is then used to synchronize the commitments in the project with the changes at the secondary server 308. As an example, assume that a commitment is consumed in a project and the commitment date is changed in the secondary server 308. Information about all commitments consumed in the project may be stored in the project as a document PID. When the project manager opens the project management application and is connected to the secondary server 308, a list of all the commitments associated with this project is retrieved using a web service interface call (GetProjectWebObjects). The commitments stored with the project are compared to the commitments retrieved from the server 308. Commitments of a particular project may be stored as the value of a document level field of a string type.

Synchronizing Commitments

When a project is opened and connection to the secondary server 308 is available, commitments stored in the project are synchronized with the commitments in the secondary server 308 to reflect any changes to commitments. For example, a consumed commitment's date may have changed, the consumed commitment may have been deleted, a date driving a provided commitment may change, or the task driving a provided commitment may have been deleted.

Deletion of a Consumed Commitment

As part of synchronizing commitments between a client, such as computer system 302, and secondary server 308, respective commitments lists are compared. If a commitment is in the client copy but it is not available in the server, the commitment has been deleted from the server. Since there is not much use having a task that is tied to a deleted commitment, the committed task is converted to a normal task.

Alternatively, the committed task may be deleted.

Date of a Consumed Commitment Changes

If the dates are different when comparing commitments in the client and secondary server 308, it means that the date of a commitment has been changed in the secondary server 308. The user may then be notified of the change and the task created from the commitment will be modified. Once the date has changed, the client copy of the commitments will be updated with the new date.

Synchronizing Provided Commitments

Once a project is opened, a list of commitments involving the project (both the commitments provided by this project and the commitments consumed by this project) is retrieved from the secondary server 308 and compared to the commitment information stored in the project. The provided commitment list is then synchronized with the consumed commitments based on the comparison.

A New Commitment is created in server

When synchronizing the provided commitments between the client and server if there is a commitment in the server copy which is not in the client version it means there is a commitment provided by this project which is not associated with any task. User may then associate the commitment with a task. The MSP_WEB_OBJECT and MSP_WEB_OBJECT_LINKS tables may be updated to store linking information. Also the client side storage may be updated to include the newly associated commitment.

For preparation of a project management schedule, as described for the example house construction project, scheduling information must be provided by a manager of the project to the project management application. Scheduling information may include information on each of a variety of tasks comprising the milestones of the overall project such as work durations for individual tasks, resource allocations including labor and material, constraints on the performance of various tasks, and dependencies between tasks and milestones. Once the scheduling engine receives the scheduling information, start/finish dates for all tasks are calculated. For example, a constraint on the performance of a task may stipulate that a given task must be completed prior to the commencement of a different task. Or, a constraint might include a stipulation that a given task must be completed during a given time period. For example, a local building code may require that materials may only be shipped to a building site during certain hours of a day to prevent traffic congestion. Dependencies provided to the project management application may include a stipulation that a second milestone may not commence until the completion of a first milestone. Dependencies may also be provided for individual tasks comprising project milestones where one task may not be started until the completion of a previous task.

As another example, suppose project manager B would like to consume a commitment after opening a commitment pane. The project management application queries the web service interface which pulls any defined commitments from the project web and then sends it back to the project management application. So, project manager B can see that project manager A has made a number of commitments. Project manager B, using the project management application, may then add one or more commitments into his/her schedule. A security layer may be implemented so that project manager B may only see commitments made by projects that he has permission to see and consume from. Once project manager B has consumed the selected commitments, the project server, via the Object Link Provider maintains the information that these have been consumed by these tasks and this project and as things change on the commitment. Project manager A is then notified of who has consumed the tasks.

As described above, E ENTERPRISE PROJECT is a project management application manufactured by MICROSOFT Corporation. Project Server is another application offered by MIRCOSOFT which enables a plurality of users to create new projects and access ongoing projects from a project server, such as project server 306, described above. For example, one organization may install Project Server on a dedicated server and then a number of project managers may install Project on individual computing systems, wherein each system is in communication with the project server. So in a typical environment what will happen is that an organization will install Project Server on a server, install Project on a computing system, and connect the Project Server via wireless or wireline to a secondary server, such as a WINDOWS SHAREPOINT Services Server, and to a database server, such as a Sequel Server.

As described herein, methods and systems are provided for creating and maintaining project related commitments using a project management application and associated resources. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method for providing cross-project commitments in a project management application, the method comprising:
   generating a project for consuming at least one commitment;
   storing the project on a project server, wherein the project server includes a commitment business object module for managing communication between the project server and a collaborative information management server, wherein the project server includes an object link provider for maintaining a link between a task of the project stored on the project server and a commitment stored on the collaborative information management server, wherein the commitment is a dependency between at least two project entities to fulfill a set of conditions, wherein the task is the outcome of fulfilling the set of conditions by the at least two project entities;
   generating a commitment for consumption by the project stored on the project server, wherein the commitment is generated independently from the task;
   storing the commitment in a shared list in a collaborative information management server to form a project web, wherein the commitment business object module writes the commitment to the project web of the collaborative information management server, wherein the commitment is stored separately from the task of the project, wherein the collaborative information management server is separate from the project server, wherein the collaborative information management server communicates with the project server by the commitment business object module, wherein the commitment is linked to the task of the project by the object link provider, wherein the project server and the collaborative information management server are synchronized upon an update to the commitment on the collaborative information management server;
   generating a commitment pane, wherein the commitment pane indicates the commitment related to the at least one task of the project; and
   alerting a user associated with the project upon the update to the commitment, wherein the user is identified by a user list associated with the collaborative information management server.

2. The computer-implemented method of claim 1, wherein the alert includes at least one member of a group comprising: an email alert, a schedule alert, and an alert associated with a project management application.

3. The computer-implemented method of claim 1, wherein the commitment business object module provides a link between the at least one task and the commitment by providing a commitment line item in the shared list and the object link provider.

4. The computer-implemented method of claim 1, wherein the commitment pane includes an associated start and end date.

5. A computer-readable storage medium having computer executable instructions for providing cross-project commitments in a project management application, the instructions comprising:
   generating a project for consuming at least one commitment;
   storing the project on a project server, wherein the project server includes a commitment business object module for managing communication between the project server and a collaborative information management server, wherein the project server includes an object link provider for maintaining a link between a task of the project stored on the project server and a commitment stored on the collaborative information management server, wherein the commitment is a dependency between at least two project entities to fulfill a set of conditions, wherein the task is the outcome of fulfilling the set of conditions by the at least two project entities;
   generating a commitment for consumption by the project stored on the project server, wherein the commitment is generated independently from the task; and
   storing the commitment in a shared list in a collaborative information management server to form a project web, wherein the commitment business object module writes the commitment to the project web of the collaborative information management server, wherein the commitment is stored separately from the task of the project, wherein the collaborative information management server is separate from the project server, wherein the collaborative information management server communicates with the project server by the commitment business object module, wherein the commitment is linked to the task of the project by the object link provider, wherein the project server and the collaborative information management server are synchronized upon an update to the commitment on the collaborative information management server;
   generating a commitment pane, wherein the commitment pane indicates the commitment related to the at least one task of the project; and
   alerting a user associated with the project that upon the update to the commitment, wherein the user is identified by a user list associated with the collaborative information management server.

6. The computer-readable storage medium of claim 5, wherein the alert includes at least one member of a group comprising: an email alert, a schedule alert, and an alert associated with a project management application.

7. The computer-readable storage medium of claim 5, wherein the commitment business object module provides a link between the at least one task and the commitment by providing a commitment line item in the shared list and the object link provider.

8. The computer-readable storage medium of claim 5, wherein the commitment pane includes an associated start and end date.

9. A system for providing cross-project commitments in a project management application, the system comprising:
   a processor; and
   a memory having computer executable instructions stored thereon, the computer-executable instructions being configured to:
      generate a project for consuming at least one commitment;
      store the project on a project server, wherein the project server includes a commitment business object module for managing communication between the project server and a collaborative information management server, wherein the commitment business object module writes a commitment to a project web of the collaborative information management server, wherein the project server includes an object link provider for maintaining a link between a task of the project stored on the project server and a commitment stored on the collaborative information management server, wherein the commitment is a dependency between at least two project entities to fulfill a set of conditions, wherein the task is the outcome of fulfilling the set of conditions by the at least two project entities;
      generate a commitment for consumption by the project stored on the project server, wherein the commitment is generated independently from the task;
      store the commitment in a shared list in a collaborative information management server to form the project web, wherein the commitment is stored separately from the task of the project, wherein the collaborative information management server is separate from the project server, wherein the collaborative information management server communicates with the project server by the commitment business object module, wherein the commitment is linked to the task of the project by the object link provider, wherein the commitment business object module provides the link between the task and the commitment by providing a commitment line item in the shared list and the object link provider, wherein the project server and the collaborative information management server are synchronized upon an update to the commitment on the collaborative information management server;
      generate a commitment pane, wherein the commitment pane indicates the commitment related to the at least one task of the project; and
      alert a user associated with the project upon the update to the commitment, wherein a user is identified by the user list associated with the collaborative information management server.

10. The system of claim 9, wherein the alert includes at least one member of a group comprising: an email alert, a schedule alert, and an alert associated with a project management application.

* * * * *